Jan. 13, 1970　　R. A. McDOUGALD ET AL　　3,489,939
ROTOR FOR DYNAMOELECTRIC MACHINE
Filed Sept. 18, 1967

INVENTORS
ROY A. McDOUGALD
HERBERT A. GAENSBAUER
BY
*James E. Davis Jr.*
THEIR ATTORNEY United States Patent Office 3,489,939
Patented Jan. 13, 1970

3,489,939
ROTOR FOR DYNAMOELECTRIC MACHINE
Roy A. McDougald, Montreal, Quebec, Canada, and Herbert A. Gaensbauer, Peterborough, Ontario, Canada, assignors to Canadian General Electric Company Limited, Toronto, Ontario, Canada, a corporation of Canada
Filed Sept. 18, 1967, Ser. No. 679,596
Int. Cl. H02k 1/24
U.S. Cl. 310—269      2 Claims

ABSTRACT OF THE DISCLOSURE

A rotor for a salient pole dynamoelectric machine has a shaft; a magnetic core body; means for mounting said core body on said shaft; and a number of magnetic pole bodies projecting radially outward from said core body. Each one of said pole bodies has two sides axially of said rotor with the pole bodies being spaced angularly on said core body so as to define between adjacent pole bodies an interpolar space bounded by a pair of opposite sides of adjacent pole bodies and said core body. A head on the outer end of each pole body has a side portion projecting beyond each of the sides of the pole body into the adjacent interpolar spaces. A pole face is on the outer surface of each head, and a lip is on the outer end of each side portion projecting inwardly towards said core body. On each pole the two lips, the two side portions, and the pole body define a pair of coil retaining recesses, and a coil embraces each pole body and has an outer end portion retained in said pair of recesses.

Each pole body has its two said sides parallel, has the inner surfaces of the side portions at right angles to the respective pole sides, and has the inner surface of each lip at an obtuse angle to the inner surface of the side portion connecting the lip to the pole body with said obtuse angle being substantially less than 180°.

Background

This invention relates to dynamoelectric machines and, in particular, to the construction of rotors for such machines.

In dynamoelectric machines intended for relatively high-speed operation, the stresses induced in the structure due to centrifugal forces introduce special problems in regard to sufficiency of mechanical strength of rotor components, in particular the field coils on a salient pole rotor for a synchronous machine. These coils tend to be relatively massive, heavy, and not very strong or rigid as a unit. Hence, if such a coil is not firmly supported on the pole body and very well braced, it tends to move as a unit, its turns tend to move relative to one another or the coil tends to become distorted, all of which can damage the coil itself or the coil along with other parts of the machine.

Therefore, the object of this invention is to improve the field pole structure of a rotor for a salient pole machine.

Brief summary of the invention

In accordance with the invention, lips on the head of each pole body overhang the outer end of the coil so as to provide additional mechanical support for the outer end turns of the coil where the coil is otherwise most susceptible to interturn movement and distortion. At least one body of a hard, strong, heat-set, resinous material is wedged between each pair of adjacent coils at the inner ends thereof for securing these ends.

Brief description of drawing

For a better understanding of the invention, reference is made to the following detailed description taken in connection with the accompanying drawings, in which.

Detailed description

Figure 1:
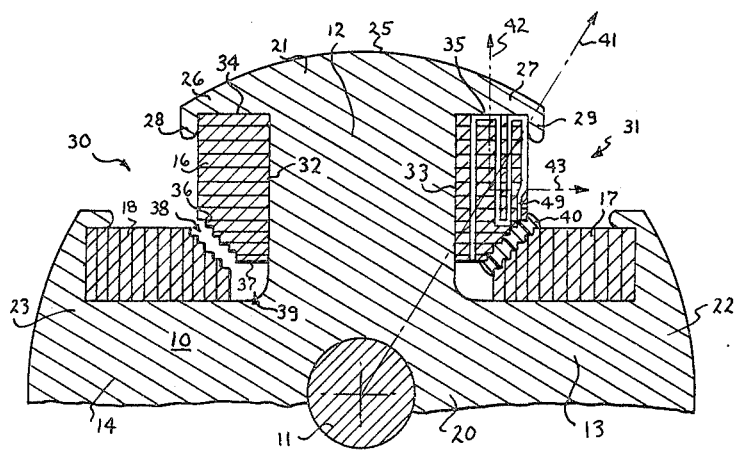
FIGURE 1 is an end view, in cross section, of a salient pole rotor for a synchronous machine.

The rotor shown in FIGURE 1 in half section is a salient pole type of field structure for a synchronous machine wherein the rotor coils are energized with direct current and the stator coils with alternating current. It has a magnetic core 10 consisting of a number of identical steel laminations or plates stacked one on another in axial alignment on a shaft 11 on which the laminations are supported in a compact stack through an interference fit of the shaft in a central hole in each plate. This particular rotor has four poles which carry four field coils on their bodies. It also has a core body 20 surrounding shaft 11 and coaxial therewith, four pole bodies projecting radially outward from the core body at equal angles, and heads on the outer ends of the pole bodies. One complete pole and two half poles are shown in FIGURE 1, identified as follows: pole bodies 12 to 14, coils 16 to 18, and pole heads 21 to 23. Each head has a pole face such as that indicated at 25 on head 21.

The core structure described so far is well known in the art. The applicants' core structure differs from the prior art in that each pole head extends across the outer end of the coil and over the outer surface thereof into the interpolar spaces. Since all four poles are alike, this feature will now be considered in more detail in connection with pole head 21. Head 21 has a pair of side portions 26, 27 which extend laterally from pole body 12 beyond its sides 32, 33 across the outer end of coil 16 and terminate in a pair of lips 28, 29 respectively turned in a short distance over the outer surface of the coil at the outer end thereof. These lips project from the ends of the side portions into interpolar spaces 30, 31 toward a core body 20. Lip 28, side portion 26, and pole side 32 define a recess 34 axially of the core on one side of the pole structure, and lip 29, side portion 27, and pole side 33 define a second recess 35 axially of the core on the other side of the pole structure. Recesses 34 and 35 are designed to receive the outer end of coil 16 as a fit sufficiently snug that the coil is given additional support with which to resist centrifugal forces. The other three poles are constructed exactly the same and give the same coil support.

Continuing with reference to FIGURE 1, it will be seen that the inner end of coil 16 is truncated; it has a tapered portion 36 and a square end portion 37. When the coil is wound from a rectangular conductor, the tapered portion may be stepped as illustrated. It will be noted also that the tapered portion of each coil is spaced a short distance from the corresponding portions of the two adjacent coils; this space is shown at 38 between coils 16 and 18. The inner end of each coil is spaced outwardly of the base of its pole body so as to leave an air channel in the interpolar space at the inner ends of each pair of adjacent coils. One of these channels is shown at 39 at the inner ends of coils 16 and 18. These channels aid in ventilating the coils.

Figure 2:
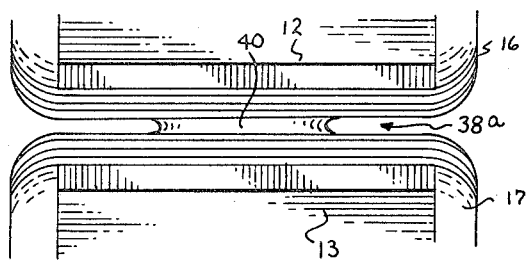
FIGURE 2 is a view of a small portion of two adjacent coils showing a coil wedging member in place between the coils.

In order to secure the coils in their outermost position on their respective pole bodies and strengthen them against the centrifugal forces, at least one member is wedged between each pair of adjacent coils in the space between the tapered portions. One such wedging member is illustrated in FIGURE 2 at 40 in the space 38a between coils 16 and 17. Member 40 is shown midway of the length of the core stack, and it should, preferably, extend almost the full radial width of the space. An effective way of wedging the coils in place is through the use of a putty-like resinous material which is packed between the coils while in an uncured or semicured state, and then cured when the epoxy or varnish in the coils is baked, to provide a wedge conforming to the opposing radially inner side portions of adjacent coil sides, as illustrated. A resinous material found to be suitable for this purpose is one sold by Glaskyd Inc., Perrysburg, Ohio under the trade name "Glaskyd." This is a molding compound of an alkyd resin mixed with short glass fibers to a consistency of a stiff modeling clay. This material can be readily packed between the coils and cures to a very tough, strong, hard body which does not shrink during curing and which bonds well to the coil surfaces, particularly the stepped surfaces. At least one body of this material is placed in the radial space between each pair of adjacent coils as shown at 40 for coils 16 and 19.

By retaining the outer end of each field coil firmly in a pair of pole head recesses such as 34, 35, and wedging the inner ends of adjacent coils in place, a strong structure is provided. This structure may be further strengthened by interleaving glass tape between the layers of the coil as illustrated in FIGURE 1 by the zigzag line 49. The centrifugal force acting on the relatively long axial portion of a coil may be represented by the radial vector 41. The transverse component 43 of this vector urges the coil turns to move away from the pole body, and the axial component 42 urges the turns to move radially with respect to the core and the coil to move bodily outward. Bodily movement of the coil is readily blocked by the pole head structure of the prior art, but turns displacement is not stopped without extensive bracing. The function of the lips on the pole heads is to hold the outer end turns of the field coils in place, and the function of the wedging members is to hold the inner end turns of the coils in place. Hence, if the turns at both ends of the coil are held firmly in place, the intermediate turns are less likely to move out of place, resulting in a structure that is stronger mechanically than otherwise attainable without elaborate bracing of the coils in the interpolar spaces.

Figure 3:
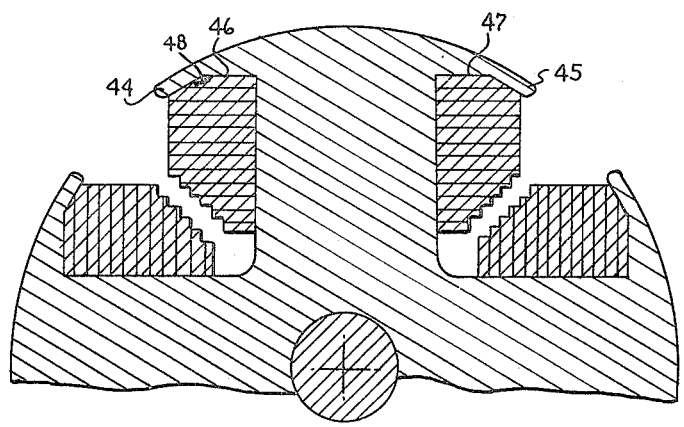
FIGURE 3 is a view like FIGURE 1 showing another embodiment of the invention.

FIGURE 3 illustrates another configuration for the lips. Instead of projecting over the outer end of the coil axially thereof as do lips 28, 29, lips 44, 45 project over the end of the coil outwardly of its axis at an obtuse angle 48 with respect to the inner surfaces 46, 47 of the side portions of the pole head. This angle should be considerably less than 180°; the nearer it is to 90°, the more effective the lip will be as coil turns retaining means. As shown in FIGURE 3, the outer end of each coil will now be truncated; it will have a square end portion bearing against surfaces 46 and 47 and a tapered portion bearing against the lips. Otherwise the structure of the coils and the wedging of their inner ends will be the same as in FIGURES 1 and 2.

Although the cores illustrated and described consists of one-piece laminations pressed onto a shaft, the invention is not necessarily limited to such a core structure.

If the rotor is large enough in diameter to warrant it, the stack of core laminations may be supported on a spider mounted on the shaft. Moreover, the pole bodies and the spider mounted on the shaft. Moreover, the pole bodies need not be integral with the core body; they may be separate components keyed to the core body. If separate components are used, the field coils may be preformed and assembled to these components before the components are keyed to the core body. In the core structure illustrated in the drawings, the field coils are wound directly on the pole bodies.

Rotors constructed according to this invention need no external coil bracing or a very minimum amount of such bracing. Eliminating the bracing from a rotor simplifies its construction, reduces its cost, and avoids any problems arising from the weight of the braces and the distribution of this weight so as to achieve proper balance of the structure.

Since lips such as 29 and 45 in effect brace the coil along its entire length, the stresses in the coil are now lower than the stresses in the more conventional structures where the bracing is at one or more points along the axial length of the coil. The absence of bracing also improves the ventilation of the field coils.

The foregoing is a description of illustrative embodiments of the invention, and it is applicants' intention in the appended claims to cover all forms which fall within the scope of the invention.

What we claim as new and desire to secure by Letters Patent of the United States is:

1. A rotor for a salient pole dynamoelectric machine comprising a shaft; a magnetic core body; means for mounting said core body on said shaft; a number of magnetic pole bodies projecting radially outward from said core body, each one of said pole bodies having two sides axially of said rotor and said pole bodies being spaced angularly on said core body so as to define between adjacent pole bodies an interpolar space bounded by a pair of opposite sides of adjacent pole bodies and said core body; a head on the outer end of each pole body having a side portion projecting beyond each of said sides of the pole body into the adjacent interpolar spaces; a pole face on the outer surface of each head; a lip on the outer end of each side portion projecting inwardly towards said core body; on each pole the two lips, the two side portions, and the pole body defining a pair of coil retaining recesses; and a coil embracing each pole body and having an outer end portion retained in said pair of recesses; each pole body having its two said sides parallel, having the inner surfaces of the side portions as right angles to the respective pole sides, and having the inner surface of each lip at an obtuse angle to the inner surface of the side portion connecting the lip to the pole body, said obtuse angle being substantially less than 180°.

2. A rotor for a salient pole dynamoelectric machine comprising a shaft; a magnetic core body; means for mounting said core body on said shaft; a number of magnetic pole bodies projecting radially outward from said core body, each one of said pole bodies having two sides axially of said rotor and said pole bodies being spaced angularly on said core body so as to define between adjacent pole bodies an interpolar space bounded by a pair of opposite sides of adjacent pole bodies and said core body; a head on the outer end of each pole body having a side portion projecting beyond each of said sides of the pole body into the adjacent interpolar spaces; a pole face on the outer surface of each head; a lip on the outer end of each side portion projecting inwardly towards said core body; on each pole the two lips, the two side portions, and the pole body defining a pair of coil retaining recesses; and a coil embracing each pole body and having an outer end portion retained in said pair of recesses, the inner end portion of each coil being tapered, a small gap left between the tapered end portions of adjacent coils, and at least one member located in each gap wedged between the tapered end portions of the coils, said member being a hard, tough, heat set, fiber reinforced, resinous material packed between the tapered end portions of the coils while in a plastic state.

References Cited

UNITED STATES PATENTS

| | | | |
|---|---|---|---|
| 1,778,678 | 10/1930 | Knecht | 310—269 |
| 2,852,711 | 9/1958 | Derner | 310—269 |
| 3,157,806 | 11/1964 | Wiedeman | 310—269 |
| 3,171,993 | 3/1965 | Stevens | 310—269 |
| 3,339,097 | 8/1967 | Dunn | 310—269 |

FOREIGN PATENTS

| | | |
|---|---|---|
| 100,208 | 7/1962 | Norway. |

MILTON O. HIRSHFIELD, Primary Examiner

R. SKUDY, Assistant Examiner